April 28, 1964     O. H. BOCK     3,131,307
OPTICAL RANGE AND VIEWFINDER FOR INVISIBLE LIGHT IMAGING DEVICES
Filed Sept. 29, 1961     5 Sheets-Sheet 1

INVENTOR.
OTTO H. BOCK
BY
ATTORNEYS

April 28, 1964 O. H. BOCK 3,131,307
OPTICAL RANGE AND VIEWFINDER FOR INVISIBLE LIGHT IMAGING DEVICES
Filed Sept. 29, 1961 5 Sheets-Sheet 4

INVENTOR.
OTTO H. BOCK
BY
ATTORNEYS

April 28, 1964     O. H. BOCK     3,131,307
OPTICAL RANGE AND VIEWFINDER FOR INVISIBLE LIGHT IMAGING DEVICES
Filed Sept. 29, 1961     5 Sheets—Sheet 5

INVENTOR.
OTTO H. BOCK
BY
ATTORNEYS

United States Patent Office 3,131,307
Patented Apr. 28, 1964

3,131,307
OPTICAL RANGE AND VIEWFINDER FOR
INVISIBLE LIGHT IMAGING DEVICES
Otto H. Bock, Tullahoma, Tenn., assignor to the United States of America as represented by the Secretary of the Air Force
Filed Sept. 29, 1961, Ser. No. 141,922
2 Claims. (Cl. 250—83.3)

This invention relates generally to an attachment for an invisible light imaging device and more particularly to a focusing arrangement utilizing visible light.

The crystals utilized in invisible light imaging devices, such as in infrared optics, are opaque for visible light and it is very difficult to achieve adequate results. There have been attempts to solve the problem by boresighting, utilizing calculations, focusing scales and/or a small source of heat which has to be moved around in the vicinity of the object to be photographed or viewed in order to check the extension and the focus of the image. These arrangements are very cumbersome and inaccurate and do not lend themselves to application, for example, to the internal sections of high speed wind tunnels. The device of this invention provides an accurate, low cost attachment to an I.R. (infrared) imaging device which enables the operator to view and focus the image of the object under investigation accurately and to photograph it by using visible light. The camera may be moved and directed in a conventional manner until the size, perspective and sharpness of the image are satisfactory. The visible light optical system and the I.R. system are mechanically coupled such that the I.R. system can be moved quickly into the position of the visible light optical system by a tilting, sliding or rotating section or by optical means such as mirrors and/or lenses. Thus, the optical range and viewfinder attachment simultaneously focuses the I.R. section which may then be operated. The attachment extends the range of application of I.R. devices in that it is possible to photograph the image produced by visible light.

Accordingly, it is an object of this invention to provide an attachment for an infrared imaging device which allows a focusing of the infrared device by means of visible light.

It is another object of this invention to provide a novel optical range and viewfinder attachment for an invisible light imaging device.

It is still another object of this invention to provide an attachment for an I.R. imaging device which extends the range of application of such devices.

It is a further object of this invention to provide an attachment for currently available I.R. imaging devices with a minimum of mechanical changes which do not in any way adversely affect the I.R. operation.

It is a still further object of this invention to provide an attachment for an I.R. imaging device which enables the same instrument to be used as a rapid sequence camera utilizing visible light and as a view camera using invisible light.

Another object of this invention involves the production of an optical range and viewfinder for an I.R. imaging device which is economical to manufacture of currently available components that lend themselves to mass production manufacturing techniques.

These and other advantages, features and objects of the invention will become more apparent from the following description taken in connection with the illustrative embodiments in the accompanying drawings, wherein.

Figure 1:
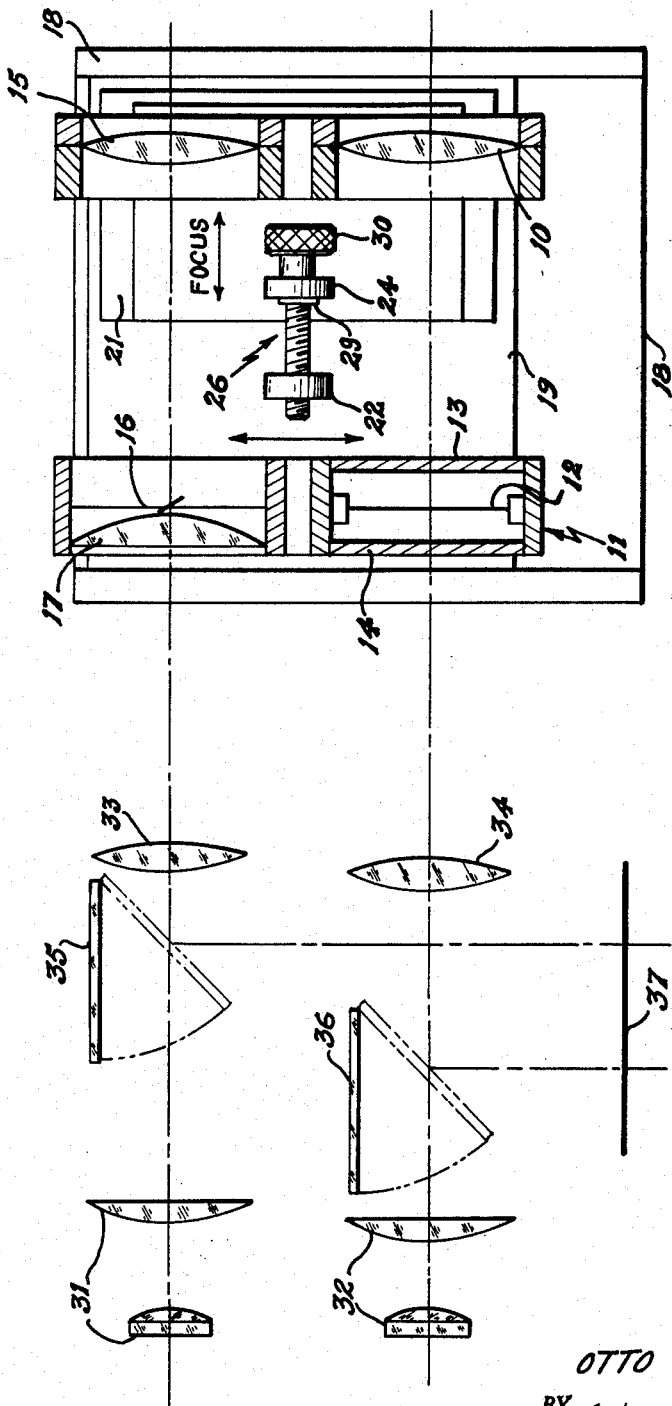
FIGURE 1 is a partially schematic representation of one form of my invention.
Figure 2:
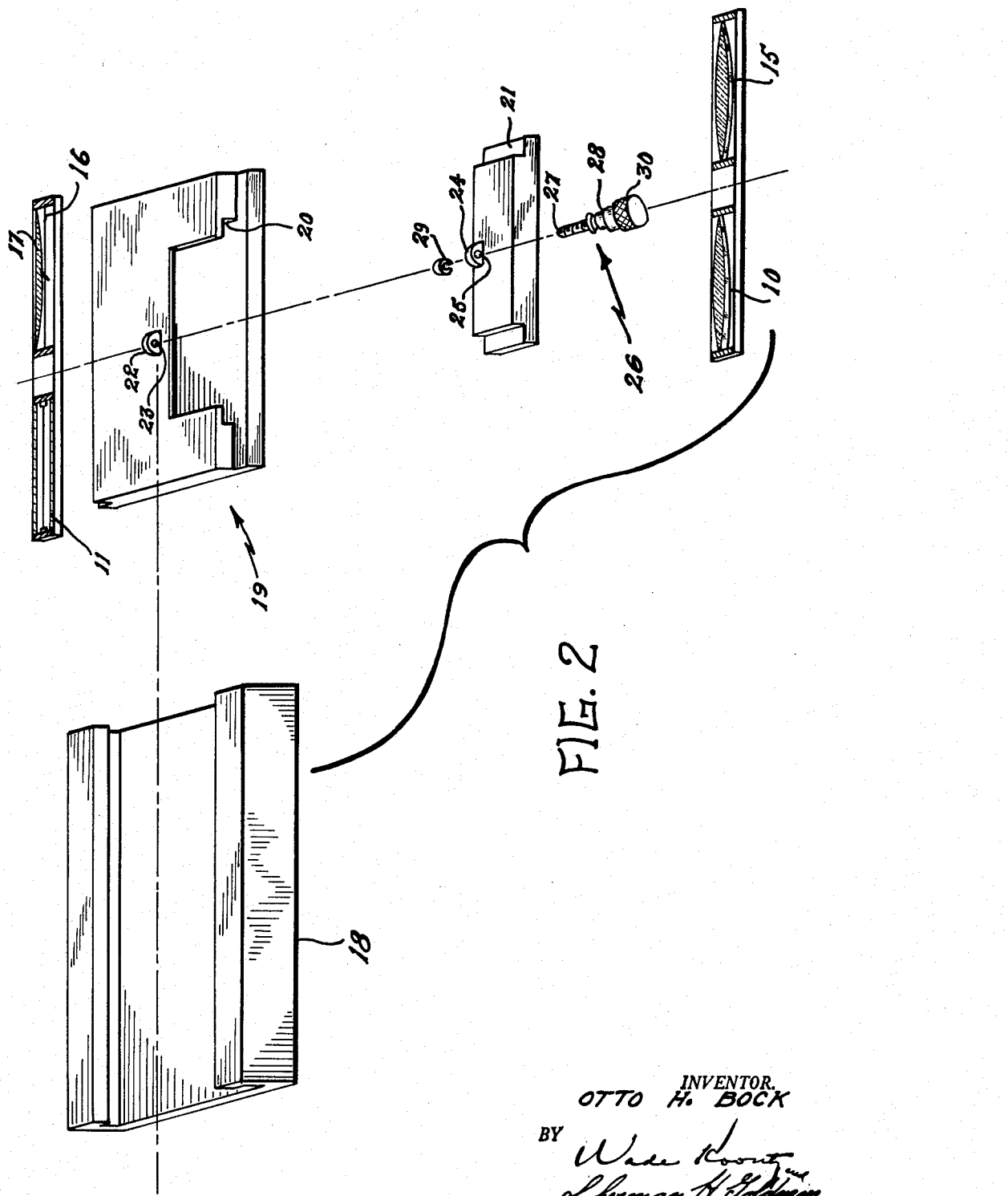
FIGURE 2 is an exploded view of the focusing arrangement.

Referring to FIGURES 1 and 2, the optical range and viewfinder of this invention is shown applied to the principles of an "Evaporograph" for infrared light which is manufactured by Baird-Atomic, Inc. The infrared portion of the device is comprised of a crystal lens 10 which is in alignment with a heat image cell 11 containing a membrane 12 therein. The lens 10 operates to gather infrared radiation from the field of view and impress the field image on the membrane 12 which absorbs the radiation and reflects the amount of heat received at each point on the membrane by altering the thickness of an oil film condensed on the rear side of the membrane. The difference in oil thickness represents temperature differentials. Since the heat means for vaporizing the oil and vacuum pump equipment attachments to the heat image cell form no part of the instant invention, they are omitted from the drawings. Crystal window 13 and glass window 14 in the heat-image cell allow for the passage of the I.R. rays to and visible light rays from the membrane and are necessary for the vacuum condition in the cell.

The visible light section of the device comprises a suitably mounted glass lens 15 in alignment with a reticle 16, for which ground glass may be substituted, and a field lens 17 which are mounted in a fixed relationship to each other.

As can be seen in FIGURES 1 and 2, a translateral guide 18 is provided for a slide member 19 on which the heat image cell 11 and the field lens 17 and reticle 16 are fixedly mounted. Slide member 19 has a portion 20 grooved within it to provide a guide for a slide member 21 on which crystal lens 10 and glass lens 15 are fixedly mounted. A raised boss 22 having an internally threaded bore 23 is provided on slide 19 while a boss 24 having a smooth bore 25 therein is arranged for reception of a bolt member 26. The threaded portion 27 of bolt 26 engages the threaded bore 23 while a stepped shoulder portion 28 abuts against one face of boss 24 and extends through bore 25 of boss 24 with a smooth running fit. A retaining ring 29 engages a groove in the stepped portion 28 so that boss 24 is effectively clamped between the retaining ring 29 and the shoulder 28. Thus, a rotation of the knurled head 30 of bolt 26 creates a relative movement of elements 21 with respect to elements 19 perpendicular to the axis of movement of 19 to create a focus adjustment.

In its most simple form an optical system stationary with respect to guide 18, such as 31 or 32 may be provided on either the axis of the visual light section or the I.R. section with slide 19 moving each section into alignment with the eyepiece arrangement. Thus, alignment of the visible light section with, for example, 31 and adjustment of focus bolt 26 will automatically focus the I.R. section which is ready for use when moved into alignment with 31.

As shown in FIGURE 1, each section of the device has its own lens system and may include a relay lens 33 to reimage the intermediate visible light image of the object to the eyepieces 31 and relay lens 34 to reimage the heat image on the membrane 12 to eyepiece 32. For this arrangement elements 18 and 19 need not be movable relative to one another.

In order to photograph each section a mirror 35, rotatable 45° to its broken line position, is provided for the visible light section while mirror 36, also pivotally arranged for 45° rotation to its broken line position, is provided for the I.R. section. Prisms or beam splitter mirrors (partially silvered) may be used in place of full reflecting mirrors to achieve the same effect. Numeral 37 designates a photographic film or plate of a conventional camera means to receive the intelligence presented via the mirrors 35, 36. The rotatable mirrors allow the operator the choice of viewing, focusing and/or photographing with both or either system. Of course, if only one lens system is used only one pivotal mirror need be provided.

Figure 3:
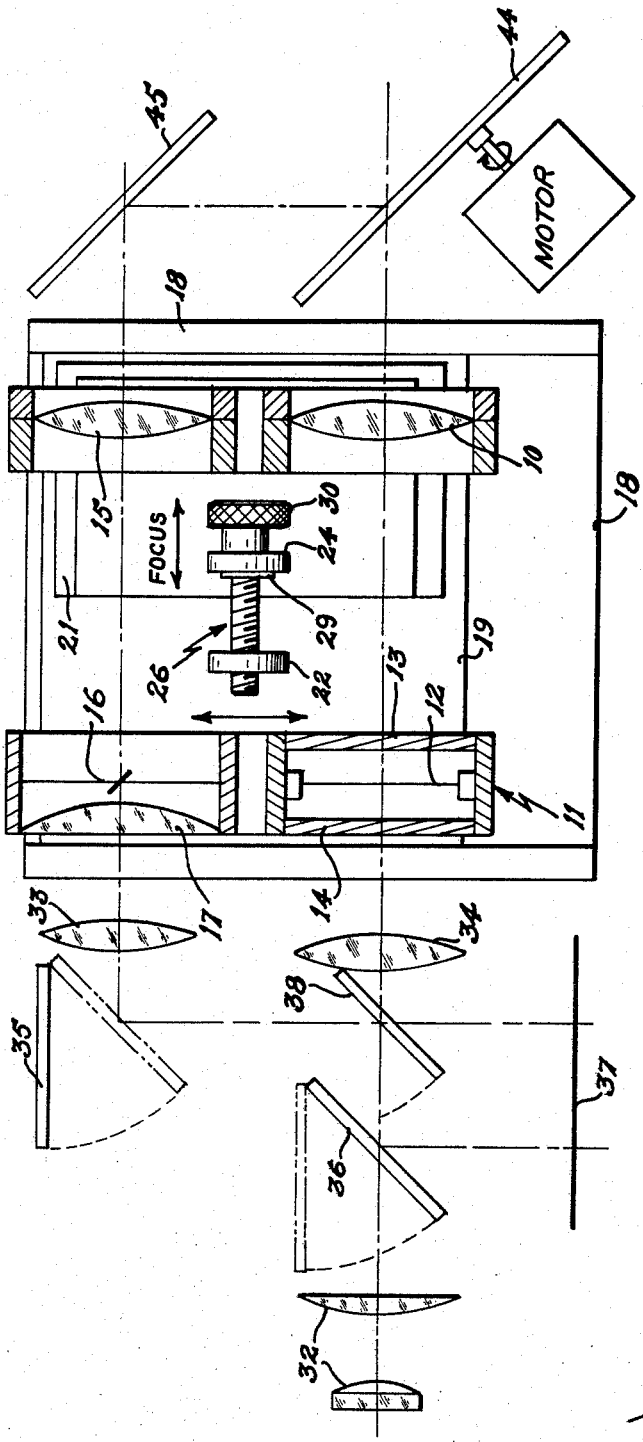
FIGURES 3–5 are partially schematic representations of alternative embodiments of my invention.

If the unit is provided with only one eyepiece and two lens systems then a mirror 38 (FIGURE 3) may be provided for alternate viewing of the image produced by either system without the use of the translateral slide. When boresighting is utilized as the method for viewing and photographing, elements 32, 34, 36 and 38 may be omitted and the translateral slide is utilized to interchange the two systems as described relative to FIGURE 1. When the field of view is large enough so that the image to be viewed could appear in both sections simultaneously, the translateral sliding arrangement may be omitted.

Figure 4:
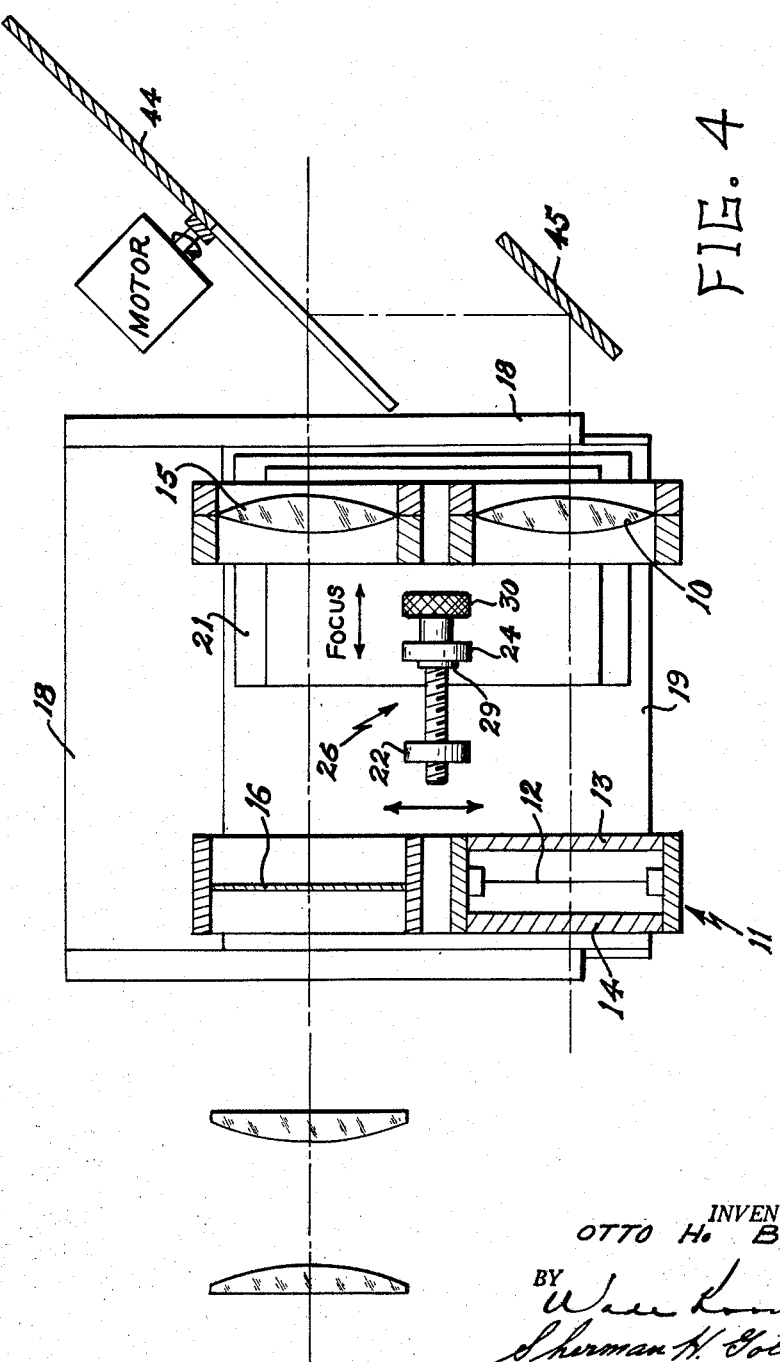

If the field of view is small then omission of the translateral sliding arrangement may be achieved by placing a mirror 44 (FIGURE 3) at a 45° angle to the I.R. optical axis to reflect visible light from the path of the crystal lens to a second mirror 45 at a 45° angle to the optical axis of the visual light section. The mirror 44 may be of circular cross-section with a sector cut out therefrom and be rotatably driven by a suitable motor or other mechanical means to permit substantially simultaneous viewing and photographing with still cameras or motion picture cameras (mirror synchronized to the shutter or film transport mechanism), to indicate by means of visible light appearance changes of the model or object during test while the system is on boresight. When the positions of mirrors 44 and 45 are interchanged, from that shown in FIGURE 3 to that of FIGURE 4, the rotating mirror 44 can be a full circle of glass (no sector cut out required). This mirror then reflects the I.R. rays to the 45° mirror 45 and into the I.R. lens system. In this case an angular sector of the rotating mirror 44 is left unsilvered to transmit the visible light rays to the glass lens. If lighting conditions permit, mirror 44 may be partially silvered (beam splitter type) and need not be rotated, i.e., light rays are then continuously transmitted and reflected in accordance with the ratio of reflectance to transmission of the splitter mirror.

Figure 5:
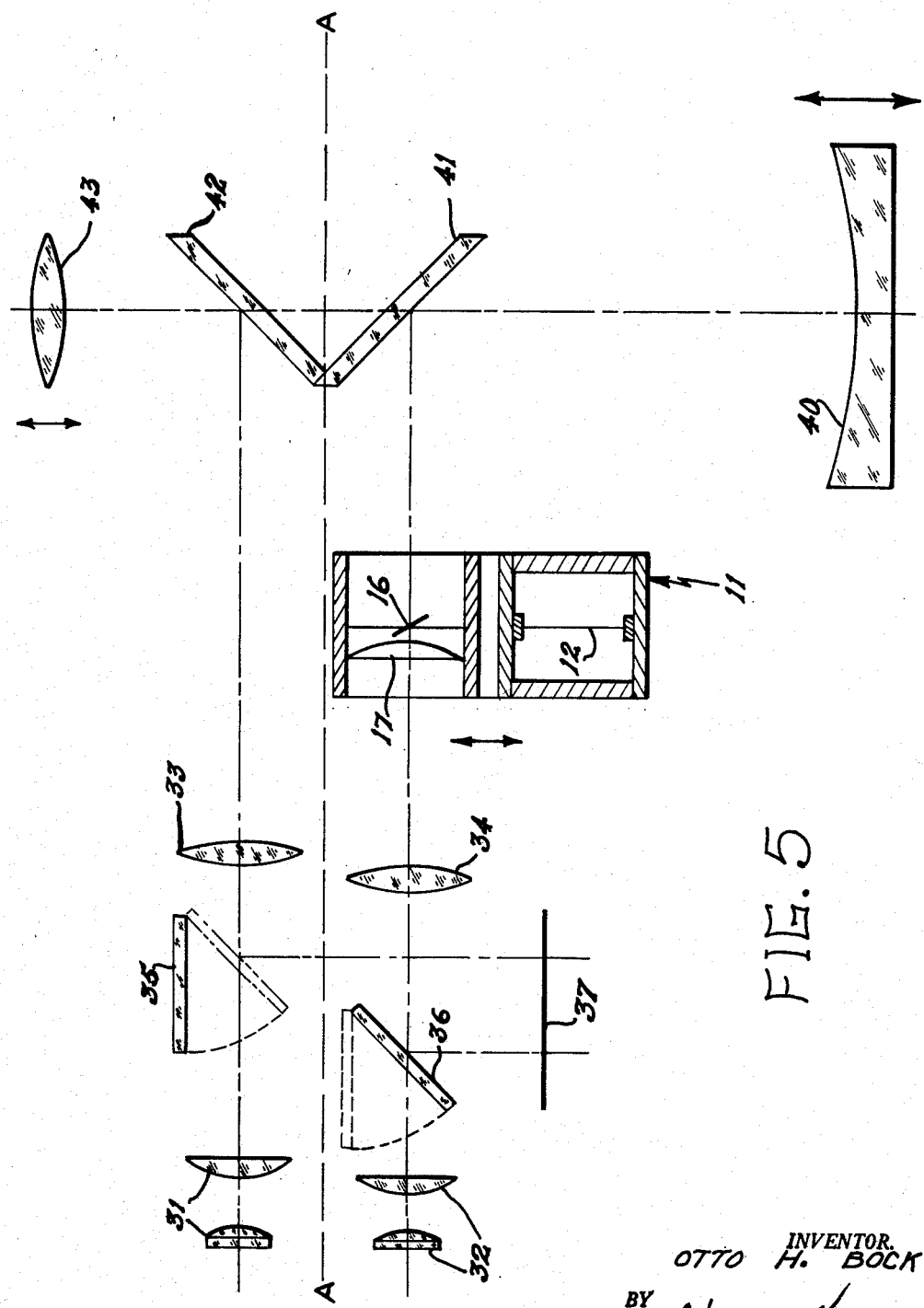

FIGURE 5 represents an alternative embodiment wherein elements 40 through 42 are added to the system. In this arrangement the heat image cell 11 and the mounting for 16 and 17 are movable as shown in the direction of the arrows adjacent thereto in accordance with the embodiment of FIGURES 1 and 2; however, the focusing is achieved by movement of the paraboloidal mirror 40 in the direction of the arrows adjacent thereto on its optical axis.

Assuming all elements above line A—A are omitted, a 45° mirror 41 is used to direct the image toward the cell 11 or reticle 16, depending on which section is in position. As shown, the device would be focused using visible light and then the I.R. section would be moved into alignment position.

When the elements above line A—A are added, 45° mirror 41 is utilized only for the I.R. section while 45° mirror 42 is used for the visible light section. Both sections would be moved to a position in alignment with the mirrors 41 and 42 thus avoiding the translateral sliding arrangement.

In addition, a glass lens 43 is provided in alignment with mirror 42 so that when paraboloidal mirror 40 is focused, lens 43 may be used as part of the independent visible light system but coupled by a cam drive system (not shown) to the paraboloidal mirror 40 for focusing by movement along its optical axis as indicated by the double arrows.

Thus, it can be seen that a visible light system may be added to an I.R. system to give it greater versatility in its application.

Although the invention has been described with reference to particular embodiments, it will be understood to those skilled in the art that the invention is capable of a variety of alternative embodiments, for example, it should be understood that the mounting of the various elements in relation to each other could be arranged by various mechanical expedients. I intend to be limited only by the spirit and scope of the appended claims.

I claim:
1. Apparatus for use with a visible light system and an invisible light system, said apparatus comprising a visible light optical system having at least a pair of elements n optical alignment and adjustable relative to one another for focusing, an invisible light optical system having at least two elements in optical alignment and adjustable relative to one another for focusing, support means for mounting said systems with their optical axes in parallelism, slidable means mounted on said support means for travel in the direction of said optical axes, the relatively adjustable elements of each of said systems being mounted on said support means and said slidable means for their relative adjustment for focusing, boss means secured to each of said support means and slidable means, rod means in engagement with both of said boss means for effecting conjoint focusing between said relatively adjustable elements of both of said systems, an ocular lens system mounted with its optical axis parallel to said previously mentioned optical axes, a base, and means on said base for slidably mounting said support means for movement transverse to said optical axes to place alternately each of said visible light systems and said invisible light system in optical alignment with said ocular lens system.

2. Apparatus as defined in claim 1 including photographic means and a mirror rotatably mounted in said ocular lens system for reflecting intelligence transmitted thereto to said photographic means.

References Cited in the file of this patent
UNITED STATES PATENTS

| | | |
|---|---|---|
| 2,522,493 | Bailly | Sept. 19, 1950 |
| 2,761,072 | Wormser | Aug. 28, 1956 |
| 2,800,023 | Obermaier | July 23, 1957 |
| 2,946,255 | Bolay | July 26, 1960 |

FOREIGN PATENTS

| | | |
|---|---|---|
| 488,522 | Great Britain | July 8, 1938 |